United States Patent [19]
Llop et al.

[11] 3,923,401
[45] Dec. 2, 1975

[54] SOLUTION CONCENTRATION RESPONSIVE APPARATUS

[75] Inventors: Helenio Llop, Montreuil; Pierre Lefort, Fontenay-sous-Bois, both of France

[73] Assignee: Societe d'Optique, Precision Electronique et Mechanique — Sopelem, Paris, France

[22] Filed: Jan. 18, 1974

[21] Appl. No.: 434,698

[30] Foreign Application Priority Data
Feb. 28, 1973 France............................ 73.07118

[52] U.S. Cl. ................. 356/135; 356/136; 250/202
[51] Int. Cl.² ........................................ G01N 21/46
[58] Field of Search ........... 356/128, 130, 131, 132, 356/133, 134, 135; 250/202

[56] References Cited
UNITED STATES PATENTS
2,933,974  4/1960  Braerman ........................... 356/131
3,751,168  8/1973  Llop et al. ........................... 356/135

Primary Examiner—Ronald J. Stern
Assistant Examiner—Conrad J. Clark
Attorney, Agent, or Firm—Cameron, Kerkam, Sutton, Stowell & Stowell

[57] ABSTRACT

Apparatus yeilding an electrical signal representative of the position of a boundary line between adjacent light and dark zones, with respect to a reference position, comprises two photoelectric cells having a separation in the direction in which the boundary moves. Means are provided whereby the output $P_1$ of that one of the photocells which is last reached by the boundary during its movement is multiplied by a constant k, yielding a signal $K.P_1$ which, together with the signal $P_2$ from the other photocell, is applied to a difference amplifier providing an output signal which passes through zero when $K.P_1 = P_2$. This signal may be applied to one input of a second difference amplifier, receiving also an output of a third differential amplifier providing a negative signal whenever $P_2$ is less than a predetermined value. The final output signal may be applied to control traversal of the assembly including the two photocells, so as to obtain a measure of the boundary displacement.

5 Claims, 4 Drawing Figures

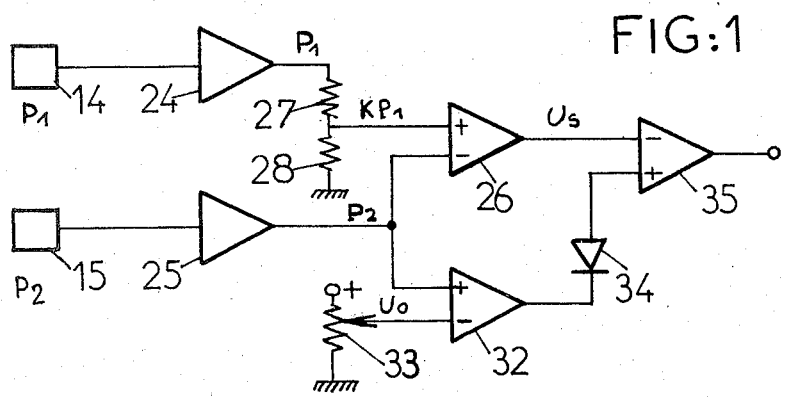
FIG:1
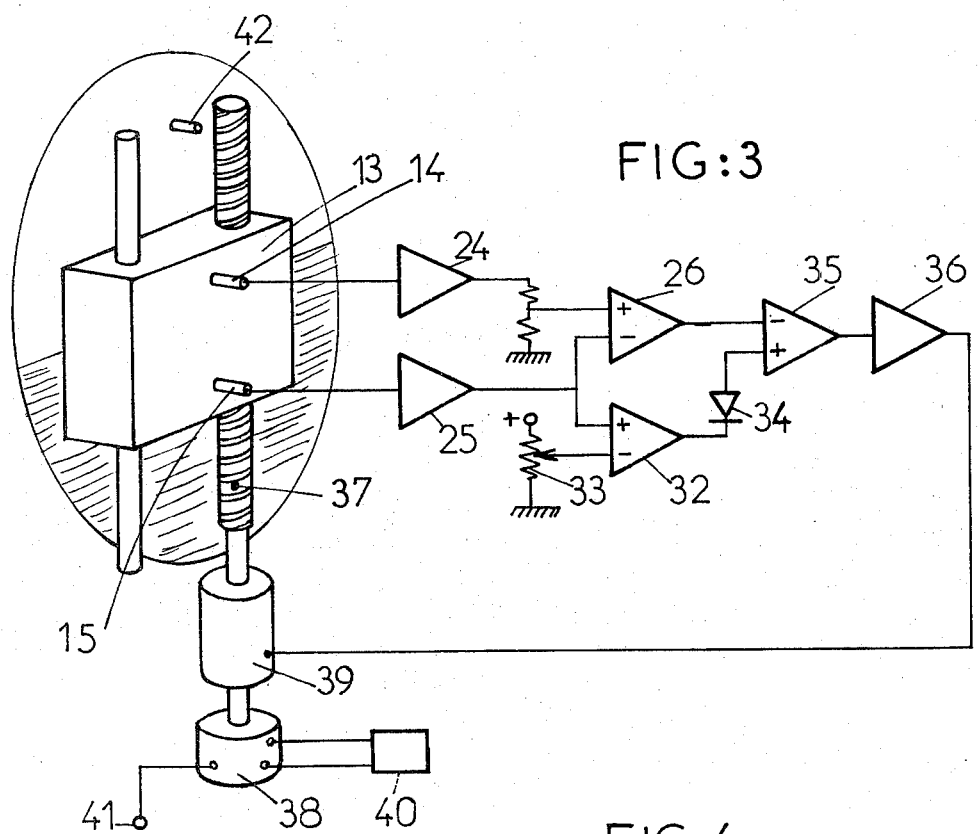
FIG:3
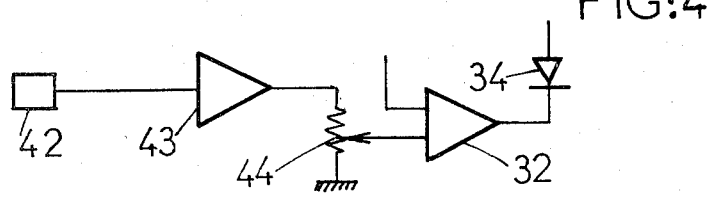
FIG:4

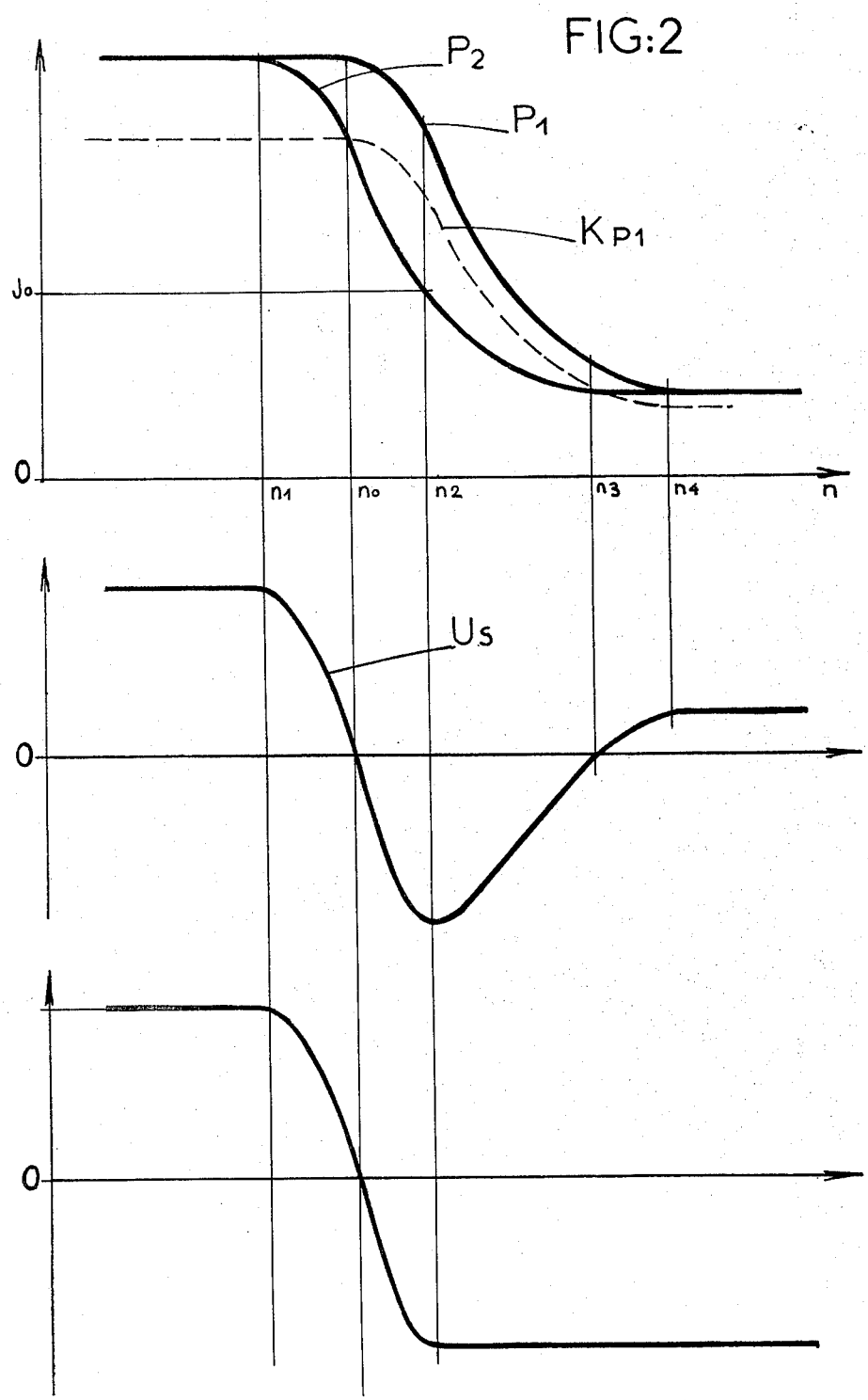

SOLUTION CONCENTRATION RESPONSIVE APPARATUS

BACKGROUND OF THE INVENTION

The invention relates to apparatus of the general kind described in U.S. Pat. No. 3,751,168 wherein light is directed upon a plane surface of a prism which in use is in contact with a solution of which the concentration is to be measured or monitored. Light internally reflected from the surface is directed towards an assembly comprising two photocells having a separation in the direction in which the boundary formed by the limit of the totally reflected light moves as the concentration of the solution varies. The outputs of the two cells are connected to means for deriving a signal related to the respective illumination of the two cells. The assembly is arranged to be servo-controlled by the derived signal so that its position represents a measure of the concentration of the solution. The prior art apparatus may therefore be used for monitoring the preparation and concentration of a solution by observing the angle of total refraction of a beam of light at an interface of which one of the media is the solution to be monitored.

The varying concentration of the solution is represented by a displacement of the boundary line separating light from dark in the reflected beam in the neighbourhood of the limiting angle and this displacement is determined by two photoelectric cells mutually displaced in the direction of displacement of the boundary line. The area of shadow extends first of all to one photocell of which the output signal $P_2$ starts to fall, then the other cell is reached in its turn and its output signal $P_1$ behaves like the other, with a constant offset to the refractive index.

In the prior art apparatus described in U.S. Pat. No. 3,751,168 aforesaid, the signal $P_1$ is produced with a constant of proportionality K 1 and the signal $K.P._1$ and $P_2$ are applied respectively to a comparator which detects the identity $K.P_1 = P_2$. The triggering of the comparator denotes the passage of the solution through a reference concentration and is utilized to produce a light or sound warning signal.

In monitoring the variation of the concentration of the solution it may, however, be desired not only to know the instant at which the concentration passes through a predetermined value, but also to know the manner in which this concentration varies about the reference value. The present invention allows the development of a continuous signal representative of this concentration and varying with this over an extended range. Such a signal may then be employed for operating servomechanisms in order to monitor and control the processing, crystallization or mixing of products entering into the solution, that is to say, to obtain a more completely automated manufacture.

Generally, apparatus embodying the invention includes means arranged to produce an electrical signal representative of the position of a boundary line between illuminated and dark zones with respect to a reference position, comprising two photocells having a separation in the direction in which the boundary moves, the output $P_1$ of that one of said cells last reached by the said boundary being multiplied by a constant of proportionality K which is less than unity to provide a modified signal $K.P_1$ which is applied to one input of a first differential amplifier, to the other input of which is applied the output $P_2$ of the other of said photocells, so that the amplifier provides an output signal passing through zero when $K.P_1 = P_2$.

In a particular embodiment of the invention, which is arranged to follow the variation of the concentration of a solution only within a relatively narrow range about the reference value, the final output signal is taken from the output of a second differential amplifier receiving at its non-inverting input the output of the first differential amplifier and at its inverting input the output signal of a third differential amplifier providing a negative signal whenever $P_2$ becomes lower than a controllable, predetermined value.

In another embodiment of the invention, arranged to follow variations of the concentration of a solution over a wide range of variation, the final output signal is applied to an apparatus arranged to traverse a movable assembly including the photocells, the movable assembly being itself connected to an arrangement for measuring its displacement.

The invention will now be described in more detail with reference to particular embodiments given by way of example and illustrated in the drawings, in which:

FIG. 1 is a functional schematic diagram of a circuit arrangement of an embodiment which is arranged to follow the variation of the concentration of a solution only within a restricted range on either side of a reference value;

FIG. 2 shows the relative variation of different signals appearing at distinct points in the circuit of FIG. 1;

FIG. 3 shows schematically the arrangement of a movable assembly carrying the photoelectric cells and the schematic functional diagram of the apparatus used when it is desired to follow the variation of the concentration over a very extended range; and FIG. 4 represents a modification of the arrangement of FIG. 3.

Referring to FIG. 1, it will be seen that the output signals $P_1$ and $P_2$ of the respective photocells 14 and 15 are applied to individual amplifiers 24 and 25. The output of amplifier 24 is applied to a resistive voltage divider composed of resistors 27 and 28, the values of which are so chosen that a signal $K.P_1$, related to signal $P_1$ at the output of amplifier 24 by a desired constant of proportionality K, appears at the junction of the two resistors, whence it is applied to the input of an inverting amplifier 26. Amplifier 26 is a differential inverter amplifer which receives at one of its inputs the signal $K.P_1$ and at the other input the signal $P_2$ derived from amplifier 25. The signal $P_2$ is likewise applied to the input of an amplifier 32 which likewise receives a reference potential $U_O$ set on a potentiometer 33. The output signal from the differential amplifier 26 is applied to the input '−' of a differential amplifier 35, of which the input '+' receives, by way of a diode 34 the output signal of amplifier 32.

If reference is made to the uppermost graph in FIG. 2 there will be seen in full line the variations of the signals $P_1$ and $P_2$ as the boundary moves in response to changes in concentration, the dark zone first of all reaching the cell 15 and then the cell 14. The characteristics of the two cells being comparable, the two curves showing the variations of $P_1$ and $P_2$ correspond to one another by a simple translation parallel to the abscissa. The same graph shows the curve $K.P_1$ derives from the curve $P_1$ by reducing all the ordinates by the factor K.

The curve $U_S$ of the central graph in FIG. 2 represents the variation of the output signal of the differential amplifier 26 as the concentration changes. Amplifier 26 being also constructed as an inverter, it may be stated that $U_S = -(K.P_1 - P_2)$. It is seen that while the two cells are both illuminated $P_1 = P_2$ and $U_S$ remains constant at the value $P_1(1 - K)$, which is positive. At a concentration $n_1$ the zone of darkness commences to reach the cell 15 and the signal $P_2$ diminishes. There results a reduction in the signal $U_S$ which however remains positive up to a concentration $n_0$ at which it passes through zero because the signal $P_2$ has become equal to $K.P_1$. Because of the relative shapes of the curves $P_2$ and $K.P_1$ the signal $U_S$ continues to diminish, becoming negative until the concentration $n_2$ is reached at which the vertical separation between the curves $K.P_1$ and $P_2$ is a maximum. Beyond $n_2$ the signal $U_S$ still remains negative but it diminishes in absolute value until the value $n_3$ is reached, when it again passes through zero and continues to increase until the value $n_4$ is reached, at which time the two photocells are both completely in the dark zone and where once again $P_1 = P_2$ and beyond which $U_S$ once again retains a constant value.

It is seen from this graph that between the values $n_1$ and $n_2$, on either side of the reference concentration $n_0$, the output signal $U_S$ of amplifier 26 varies with the position of the boundary about the reference concentration $n_0$. This signal $U_S$ may therefore be made use of to represent the position of the boundary. This arrangement alone may be used as long as the operation to be monitored results in variations of the refractive index which do not exceed the value $n_2$. In this case the arrangement could remain that of FIG. 2 of U.S. Pat. No. 3,751,168, modified by the amplifier 26 being made a differential amplifier instead of a simple comparator.

If, on the other hand, during the course of the operation the concentration exceeds the value $n_2$, it is seen that for values above $n_2$ the signal $U_S$ then varies inversely with the displacement of the boundary. To be able to make use of the signal $U_S$ it is then only necessary to ensure that the range of variation remains between $n_1$ and $n_2$, which is allowed by the arrangement of FIG. 1. Here the potentiometer 33 is adjusted in such a manner that its output voltage $U_O$ corresponds to the value of the signal $P_2$ at the concentration $n_2$. It is seen that when the signal $P_2$ is lower than $U_O$ the output of the amplifier 32 will be negative, the diode 34 will be conductive and the amplifier 35 will be held at a negative potential. When, on the other hand, $P_2$ is greater than $U_O$, that is to say, when it is in the positive range where the input signal $U_S$ is decreasing in value, the amplifier 35 will be unblocked and the linearly amplified signal $U_S$ will appear at its output. The lowermost graph in FIG. 2 represents the variations of the final output signal at the amplifier output, which will be substantially proportional to the difference between the set value $n_0$ for the sensor and the measured value when this is in the range between $n_1$ and $n_2$ and it will be saturated, positively or negatively, outside these limits.

The final signal may be made use of directly for control or recording of values around a reference value $n_0$, or it may also be used to control a motor producing traversal of a carriage carrying the photocells, in such a manner that this will continuously follow the boundary line. This is the arrangement which is represented in FIG. 3. Here the photocell carrying carriage 13 is controlled by a screw 37 driven by a motor 39. The output signal of amplifier 35 is inverted in the amplifier 36 and used to drive the motor 39. A servomechanism is thus provided by means of which the carriage 13 continuously follows the displacement of the boundary line. It is thus the displacement of the carriage which represents the variation of concentration being monitored, and it could be convenient to represent this carriage displacement by a signal more convenient to make use of in an automatic installation, for example, by an electric signal. This is what is done in the embodiment represented by FIG. 3, where a potentiometer 38, fed from a voltage source 40 of high stability, is coupled with the screw 37 controlling the carriage. The output signal of the potentiometer, available at 41, is then representative of the position of the carriage 13 and hence of the concentration of the solution.

The apparatus of FIG. 4 represents a modification by way of improvement, in which the general level of illumination is taken into account in determining the threshold level $U_O$. Here the value $U_O$, instead of being adjusted to a fixed level by means of the potentiometer 33 of FIGS. 1 and 3, is obtained from a signal provided by a photocell 42 placed at the edge of the image of the boundary line (FIG. 3). The signal supplied by the photocell 42, amplified by an amplifier 43, is adjusted by means of a potentiometer 44 and is applied to the input of the amplifier 32 as previously. The threshold $U_O$ is thus made proportional to the general level of illumination and thus to the signal $P_2$ and the position $n_2$ becomes independent of the received light.

It should be noted that the invention is not limited to the embodiments described, but includes also other embodiments differing only in detail or modifications of construction falling with the scope of the claims.

This same technique of determining the position of a luminous boundary, independently of its contrast and of its light level, is not limited to its application to refractometers, but may be applied anywhere where it is desired to determine the position of a transition passing progressively from a dark zone to an illuminated zone.

What is claimed is:

1. In solution concentration responsive apparatus including means whereby light is directed inclinedly upon a plane surface of a prism, said surface being in contact with said solution, and means whereby light reflected internally from said surface is directed towards two photoelectric cells having a separation in the direction in which the boundary formed by the limit of the totally reflected light moves as the concentration of said solution varies, the outputs of said cells being connected to means for deriving a signal related to the respective illuminations of said cells, the improvement which comprises:

multiplier means arranged to multiply the output $P_1$ of one said photoelectric cell by a constant of proportionality less than unity thereby to develop a modified output signal $K.P_1$;

a first differential amplifier;

means applying said modified signal to one input of said differential amplifier;

means applying the output $P_2$ of the other of said photoelectric cells to the other input of said differential amplifier whereby the output signal of said first differential amplifier passes through zero when $K.P_1 = P_2$, said differential amplifier output signal being applied to an input of a second differential amplifier, to the second input of which is applied the output of a third differential amplifier, said third differential amplifier receiving said other photocell signal $P_2$ and a reference signal and providing a negative signal when the signal $P_2$ is less than said reference signal.

2. The invention claimed in claim 1 wherein said reference signal is derived from a photoelectric cell exposed to said light.

3. The invention claimed in claim 2 wherein said output signal of said first differential amplifier is applied to control the traversal in the direction of movement of said boundary of a movable assembly including said photoelectric cells thereby to minimise said output signal, said movable assembly being coupled with a means for developing an electric signal representative of the position of the assembly and of the boundary.

4. The invention claimed in claim 1 wherein said output signal of said first differential amplifier is applied to control the traversal in the direction of movement of said boundary of a movable assembly including said photoelectric cells thereby to minimise said output signal, said movable assembly being coupled with a means for developing an electric signal representative of the position of the assembly and of the boundary.

5. The invention claimed in claim 1 wherein said output signal of said first differential amplifier is applied to control the traversal in the direction of movement of said boundary of a movable assembly including said photoelectric cells thereby to minimise said output signal, said movable assembly being coupled with a means for developing an electric signal representative of the position of the assembly and of the boundary.

* * * * *